(No Model.) 2 Sheets—Sheet 2.
B. C. HICKS.
VELOCIPEDE.
No. 557,387. Patented Mar. 31, 1896.
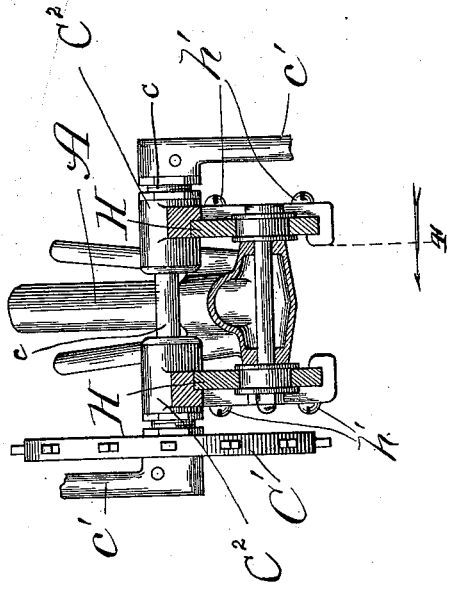
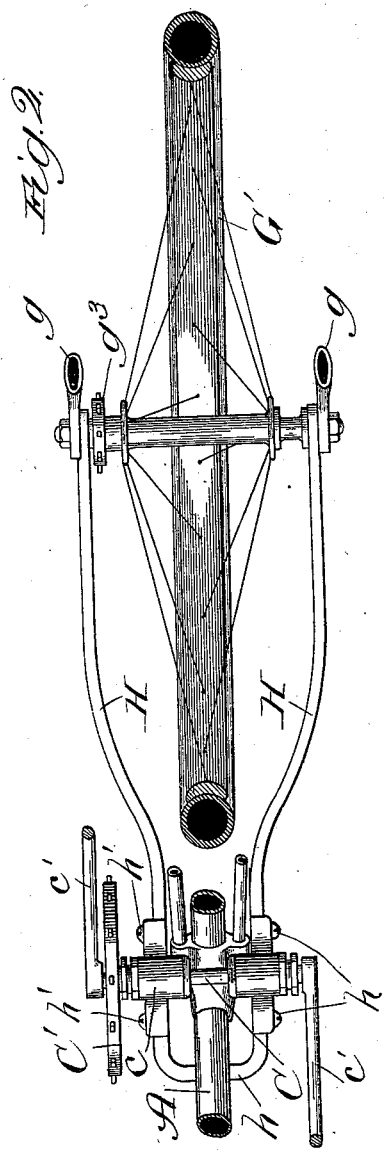
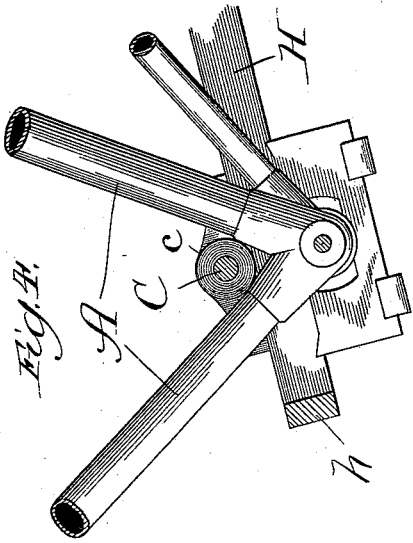
Witnesses:
Inventor:
Bohn C. Hicks,
By Banning & Banning & Sheridan,
Att'ys

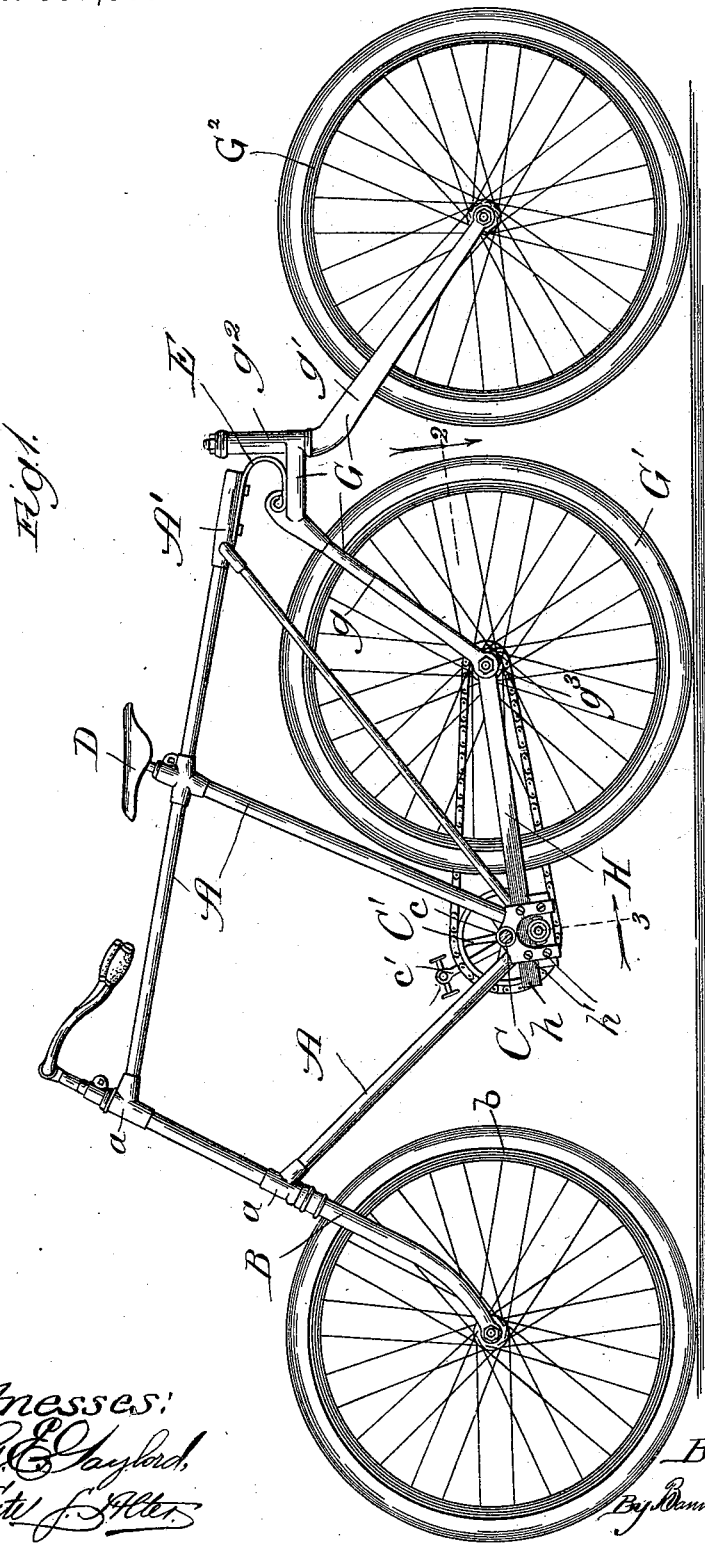

United States Patent Office.

BOHN C. HICKS, OF CHICAGO, ILLINOIS, ASSIGNOR TO THE REX CYCLE COMPANY OF CHICAGO, OF SAME PLACE.

VELOCIPEDE.

SPECIFICATION forming part of Letters Patent No. 557,387, dated March 31, 1896.

Application filed August 27, 1895. Serial No. 560,654. (No model.)

*To all whom it may concern:*

Be it known that I, BOHN C. HICKS, a citizen of the United States, residing at Chicago, Illinois, have invented certain new and useful Improvements in Velocipedes, of which the following is a specification.

The object of my invention is to provide a simple, economical and efficient velocipede, adapted to absorb and minimize the shocks incident to riding the vehicle over obstructions, and it is intended to be an improvement on the velocipede shown, described and claimed in a patent granted to me October 22, 1895, No. 548,366.

The invention consists in the features, combinations, and details hereinafter described and claimed.

In the accompanying drawings, Figure 1 is a side elevation of a velocipede fitted with my improvements; Fig. 2, an enlarged sectional plan view of a portion of the vehicle, taken in line 2 of Fig. 1; Fig. 3, an enlarged transverse sectional view of a portion of the mechanism, taken in line 3 of Fig. 1; and Fig. 4, a side elevation of a portion of the mechanism shown in Fig. 3 and taken on line 4.

In the use of vehicles, especially velocipedes and bicycles, it is well known that in riding over an obstruction a shock is imparted to the rider and vehicle, which is likely, when repeated a number of times, to injure the rider and result in destruction of the vehicle or some of its various parts. My invention is designed to overcome these objections by providing a velocipede that will permit of riding over ordinary obstructions, such as are more fully hereinafter set forth.

In illustrating my improvement I have only thought it necessary to show it in connection with the well-known "rear-driven" safety-bicycle; but it will be understood that it may be adapted to the various styles of velocipedes, with slight mechanical changes and without departing from the spirit of my invention.

In constructing my improvement I provide a main frame A of the desired size and shape and which, as shown in Fig. 1, is provided with the usual front fork B, pivoted thereto at $a$, steering-wheel $b$, bearing-bracket C, and saddle D. The main frame is extended to the rear of the saddle, as at A', and provided, preferably, with a curved spring E, to which is secured an auxiliary frame G. This auxiliary frame consists of a front depending member $g$, carrying the driving-wheel G', and a rearwardly-depending member $g'$, carrying a supplemental wheel $G^2$. The rearward depending member $g'$ is preferably pivoted to the auxiliary frame at $g^2$ in any desired manner and the parts so arranged, as clearly shown in the drawings, that the auxiliary frame is rigid longitudinally, but permits the supplemental wheel to follow easily in the track of the driving-wheel. It will also be seen that all the wheels are arranged substantially in a longitudinal line, so that the front and rear wheels will stay on the ground while the intermediate driving-wheel may rise over obstructions and very little, if any, shock be caused thereby.

To operate or drive the velocipede, a bearing-bracket $c$ is provided, carrying the usual crank-shaft C, mounted in bearing portions $C^2$ $C^2$, and which in turn is provided with the usual crank and pedals $c'$ and sprocket C'. The driving-wheel is also provided with the usual sprocket-wheel $g^3$, over which is passed a sprocket-chain $c^2$, which also connects it with the driving-sprocket. To keep the centers of these two sprocket-wheels at all times the desired distance from each other and permit the free movements of the driving-wheel, a pair of bars H are provided, which are preferably connected together at their front ends, as at $h$, and pivoted to the axle of the driving-wheel. The bearing-bracket is also pivoted to the main frame on the crank-shaft, so as to permit the connecting-bar to vibrate with the movements of the driving-wheel. The connecting-bar is adjustably secured to the bearing-bracket by means of the screws $h'$, so as to enable the rider to take up the slack of the chain when desired.

In using a vehicle fitted with my improvements the saddle may be placed in any desired position; but I prefer to place it, as shown in the drawings, substantially over the driving-wheel and to the front of the point where the auxiliary frame is pivoted to the main frame, so that while riding, when the driving-wheel strikes an obstruction it rises or passes over the same with the least discomfort to the rider and least injury to the machine.

I claim—

1. In a velocipede, the combination of a main frame having at least one supporting-wheel, an auxiliary frame connected with the main frame at or near the rear end and provided with at least two wheels arranged longitudinally with respect to each other, and a flexible bar connection between the rear end of the main frame and the auxiliary frame, substantially as described.

2. In a velocipede, the combination of a main frame provided with a front steering-wheel, seat or saddle, with an auxiliary frame flexibly connected therewith to the rear of the seat and provided with at least two wheels arranged longitudinally with respect to each other, a sprocket-wheel on a portion of the main frame, a sprocket-wheel on the driving-wheel, a chain connecting the two, and means for preserving the desired distance between the two sprocket-wheels and permitting the free movement of the driving-wheel, substantially as described.

3. In a velocipede, the combination of a main frame provided with a front steering-wheel and other usual parts, an auxiliary frame flexibly connected thereto in the rear of the seat portion and provided with at least two wheels arranged longitudinally with respect to each other, one a driving-wheel and the other a supplemental wheel, and a curved spring flexibly connecting the auxiliary with the main frame so as to permit of an independent vertical movement of the driving-wheel and maintain a longitudinal rigidity of the frame, substantially as described.

4. In a velocipede, the combination of a main frame provided with a front steering-wheel and other usual parts, an auxiliary frame flexibly connected thereto in the rear of the seat portion and provided with at least two wheels arranged longitudinally with respect to each other, one a driving-wheel and the other a supplemental wheel, a curved spring flexibly connecting the auxiliary with the main frame so as to permit of an independent vertical movement of the driving-wheel and maintain a longitudinal rigidity of the frame, and a bar or bars pivotally connecting the axle of the driving-wheel with the main frame substantially at the crank-shaft to preserve a desired distance between the two and permit a free movement of the driving-wheel, substantially as described.

BOHN C. HICKS.

Witnesses:
THOMAS A. BANNING,
THOMAS B. MCGREGOR.